(12) United States Patent
Lee

(10) Patent No.: US 6,348,902 B1
(45) Date of Patent: Feb. 19, 2002

(54) DISPLAY DEVICE HAVING PASS-THROUGH FUNCTION FOR PICTURE SIGNAL

(75) Inventor: Seung-taek Lee, Kyungki-do (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/061,037

(22) Filed: Apr. 16, 1998

(30) Foreign Application Priority Data

Apr. 16, 1997 (KR) .............................. 97-13932

(51) Int. Cl.$^7$ ................................. G06F 3/00
(52) U.S. Cl. ................... 345/1; 345/2; 345/329
(58) Field of Search ................. 345/329, 1, 2

(56) References Cited

U.S. PATENT DOCUMENTS

| | | | |
|---|---|---|---|
| 4,679,091 A | * 7/1987 | Kikuchi et al. | ............. 348/543 |
| 5,566,290 A | * 10/1996 | Silverbrook | ................ 345/473 |
| 5,713,040 A | * 1/1998 | Lee | ............................ 395/800 |
| 5,910,814 A | * 6/1999 | Portman et al. | .............. 725/77 |

OTHER PUBLICATIONS

Proxima video projector User's Manual, date and model unknown.*
NEC LT–100 video projector User's Manual, from www.nec.com, date not shown.*
NEC MultiSync MT video projector User's Manual, date not shown.*
Philips Consumer Electronics Company ScanCard web page at www.philipspro.com/scan$_{13}$cover.htm.*
ALTINEX Distribution Amplifiers web page at www.altinex.com/Solutions/Distribution_Amplifiers/distribution_amplifiers_center.htm.*
Markus, Sourcebook of Electronic Circuits, 1968, p. 13.*
Kaufman and Thomas, Introduction to Color TV, 1954, p. 82.*
Capital Technologies, CapView 38 " Monitor Specifications, Jan. 1997, www.captechinc.com/spec38.htm.*
Government Service Department, RCA Service Company, Closed–Circuit Television Systems Color and Monochrome, 1958, pp. 114–116 (Book I, Monochrome Systems).*
Butterworth, "Big Screen Brouhaha," Dec. 1994, VIDEO Magazine, pp. 50–53, 80, 84.*
Niles Audio Corporation, "VDA–6 Video Distribution Amplifier" and "Audio/Video Distribution Amplifiers," 1999, www.nilesaudio.com/newpages/vidda.html.*

* cited by examiner

Primary Examiner—Steven Saras
Assistant Examiner—William C. Spencer
(74) Attorney, Agent, or Firm—Robert E. Bushnell, Esq.

(57) ABSTRACT

A display device, for connection to a host computer generating a primary video signal, has a pass-through function which provides primary and secondary video outputs. The secondary video output, consisting of an RGB image signal and synchronization signals, corresponds to the primary video signal, so that identical picture signals generated from a single source, i.e., the host computer, can be simultaneously applied directly to multiple display devices with minimum cable connections and a high signal-to-noise ratio.

9 Claims, 4 Drawing Sheets

DISPLAY DEVICE HAVING PASS-THROUGH FUNCTION FOR PICTURE SIGNAL

CLAIM OF PRIORITY

This application makes reference to, incorporates the same herein, and claims all benefits accruing under 35 U.S.C. §119 from my application entitled Display Device Having Pass-through Function for Picture Signal filed with the Korean Industrial Property Office on Apr. 16, 1997 and there duly assigned Ser. No. 97-13932 by that Office.

BACKGROUND OF THE INVENTION

1. Field of the Invention

The present invention relates to a display device having a pass-through function which is adapted to apply the picture signal generated from a single source to multiple display devices.

2. Discussion of Related Art

As a rule, a single-source picture signal generated by a host computer is applied to just one display device for amplification and display via a cathode ray tube (CRT). In the event that a user wishes to display this picture signal, on more the one display device, the picture signal is split and applied to a plurality of display devices. In doing so, an impedance mismatch generally occurs between the signal source output and the video input of a display device. Therefore, an external device such as a signal splitter having one input and plural outputs is conventionally used to adapt the single source to multiple displays and thereby compensate for the impedance mismatch condition so that image quality can be maintained at every video input.

Such as system, however, has some distinct drawbacks.

First, the incorporation of numerous cable connections for the simultaneous display of a single picture via plural monitors reduces reliability and increases maintenance costs. In addition, the manipulation of such externally connected auxiliary equipment is cumbersome and inconvenient and results in an unsightly system design.

Second, though the number of cable connections may be reduced by using a signal splitter having a fixed number of output ports for a given number of display, such a stipulation restricts the expansion and modification of an installed computer system. For example, with a four-way signal splitter providing four outputs to four monitors, the addition of an extra monitor would require an extra output port; however, the implementation of two such splitters (a five-way splitter being non-standard) requires loads for the three unused ports.

Third, the commercially available signal splitters typically employed are essentially passive (resistive) devices which, if strung together, have an accumulative lossy effect on the video signal for every additional monitor. Thus, signal strength may be significantly reduced, lowering the signal-to-noise ratio and deteriorating the quality of the displayed image accordingly.

SUMMARY OF THE INVENTION

It is therefore an objective of the present invention to provide a display device having a pass-through function in which an applied picture signal generated from a single source can be secondarily applied to another display device for simultaneous display.

It is another objective of the present invention to provide a display device having a pass-through function which improves system reliability and reduces maintenance costs by minimizing the number of cable connections when employing multiple such displays.

It is yet another objective of the present invention to provide a display device having a pass-through function which enables a computer system employing multiple such displays to be freely expanded or modified.

It is still yet another objective of the present invention to provide a display device having a pass-through function which improves display quality by increasing the signal-to-noise ratio in a computer system employing multiple such displays.

To achieve these and other advantages and in accordance with the purpose of the present invention, as embodied and broadly described, there is provided a display device for receiving a primary video signal generated by a host computer. The display device comprises pass-through means for outputting the primary video signal and a secondary video signal corresponding to the primary video signal.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENT

Figure 1:
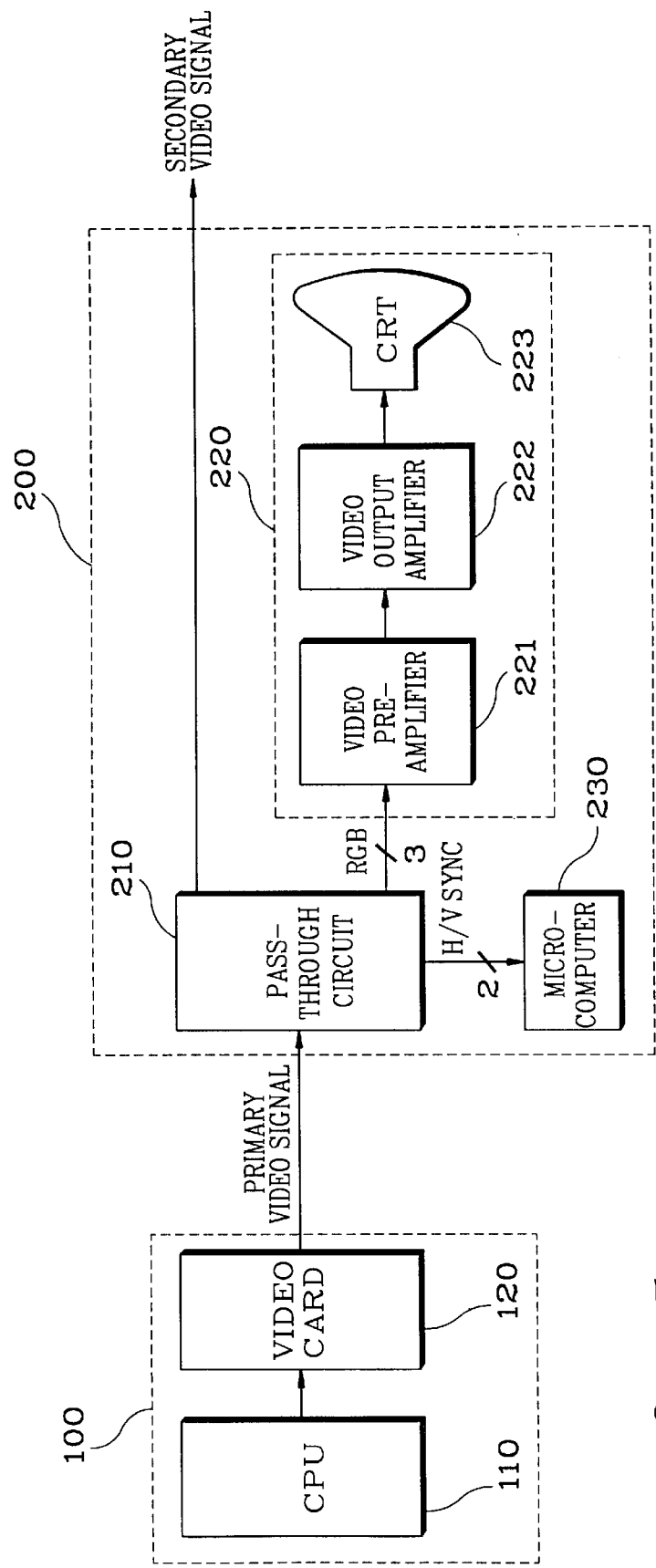
FIG. 1 is a block diagram of a computer system including a display device having a pass-through function according to the present invention.

Referring to FIG. 1, a display device 200 receives a video (RGB image plus H/V sync) signal generated by a video card 120 under the control of a central processing unit (CPU) 110 of a host computer 100 serving as a primary signal source. The display device 200 is comprised of a pass-through circuit 210 for receiving a primary video signal from the signal source and outputting the primary video signal and a secondary video signal (R'G'B', H' & V'); a microcomputer 230 for processing the synchronization signals; and a video circuit 220 for processing and displaying the RGB signal in accordance with signals processed by the microcomputer 230. The video circuit 220 includes a pre-amplifier 221 and a video output amplifier 222, connected in series, for amplifying the RGB image signal from the pass-through circuit 210; and a CRT 223 for displaying the amplified image signal.

Figure 4:
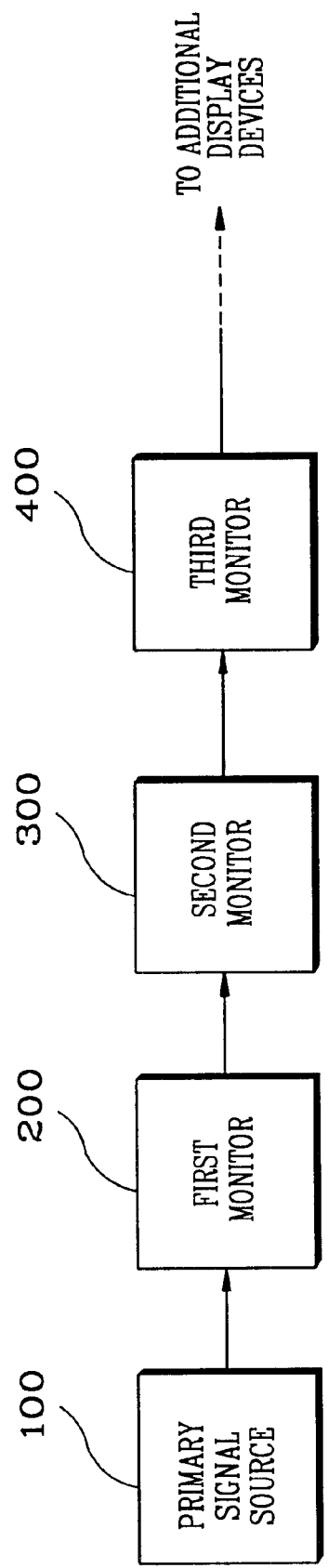
FIG. 4 illustrates a computer system adopting the principles of the present invention.

In the operation of a computer system adopting the principles of the present invention, the execution of software via the CPU 110 of the host computer 100 causes the video card 120 to generate video information for display. The video information includes an RGB image signal which is output together with horizontal and vertical synchronization signals. The pass-through circuit 210 receives the generated video signal and, by performing a signal splitting operation, outputs both primary and secondary video signals, with the latter being amplified for output. The secondary video signal can then be used as a picture signal source for realizing a simultaneous multi-display function using multiple display devices (as shown in FIG. 4). That is, the secondary video signals R', G' & 2' and H' & V' generated by the display device 200 can be applied to another such display device, for use as a secondary source of the same picture signal.

Meanwhile, the internal RGB image signal (which is the same as the primary RGB image signal) provided at the output of the pass-through circuit 210 is processed in the video circuit 220 which displays the desired image in accordance with the executed software. Also, the internal horizontal and vertical synchronization signals (which are the same as the primary synchronization signals) provided at the output of the pass-through circuit 210 are input to the microcomputer 230 for normal processing.

Figure 2:
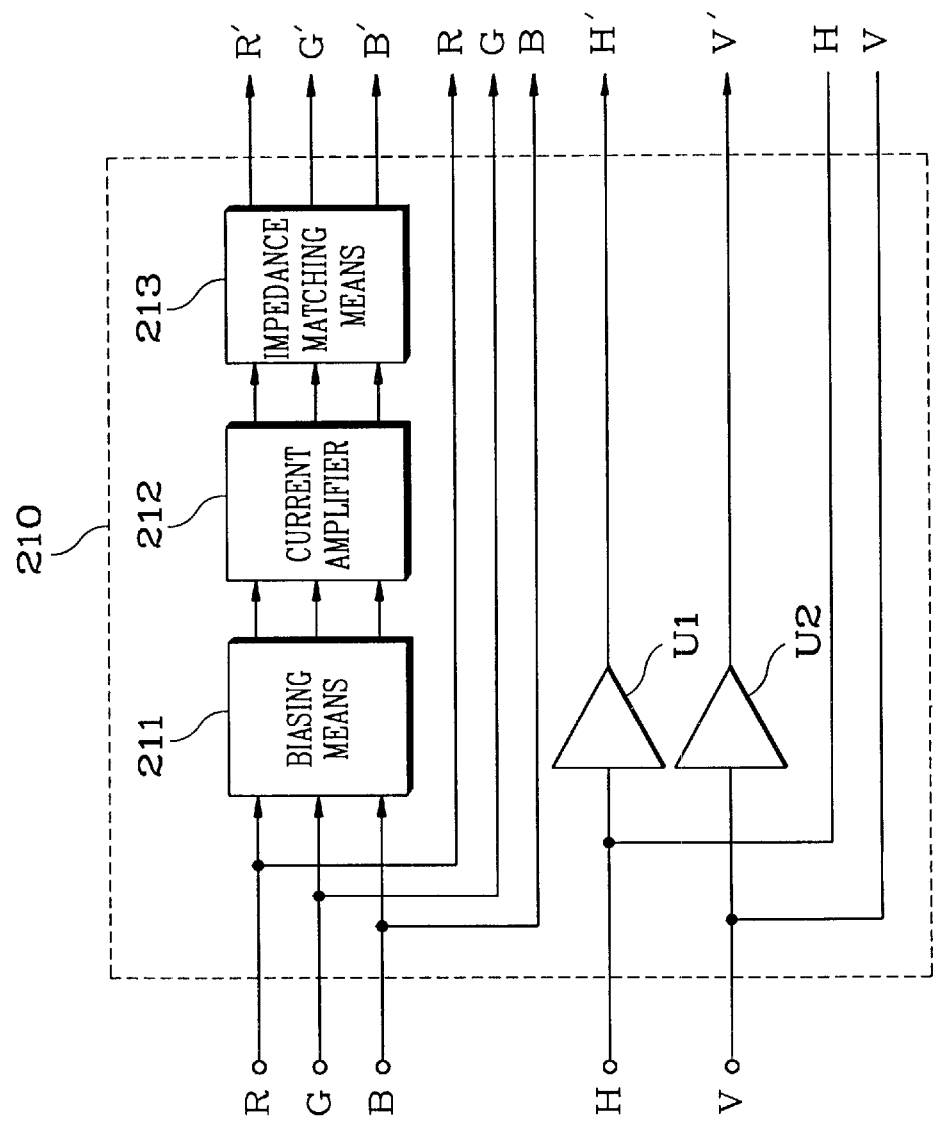
FIG. 2 is a block diagram of the pass-through circuit shown in FIG. 1.

As shown in FIG. 2, the pass-through circuit 210 is comprised of biasing means 211 for biasing each image signal in order to provide a stabilized secondary RGB image output, a current amplifier 212 for amplifying the current component of each color, impedance matching means 213 for the impedance compensation of each amplified signal, and a pair of buffers U1 and U2 for buffering the synchronization signals Thus, the pass-through circuit 210 respectively receives and splits the red (R), green (G) and blue (B) image signals and the horizontal (H) and vertical (V) synchronization signals generated by the video card 120 in the host computer 100 and thereby provides primary and secondary video outputs.

Figure 3:
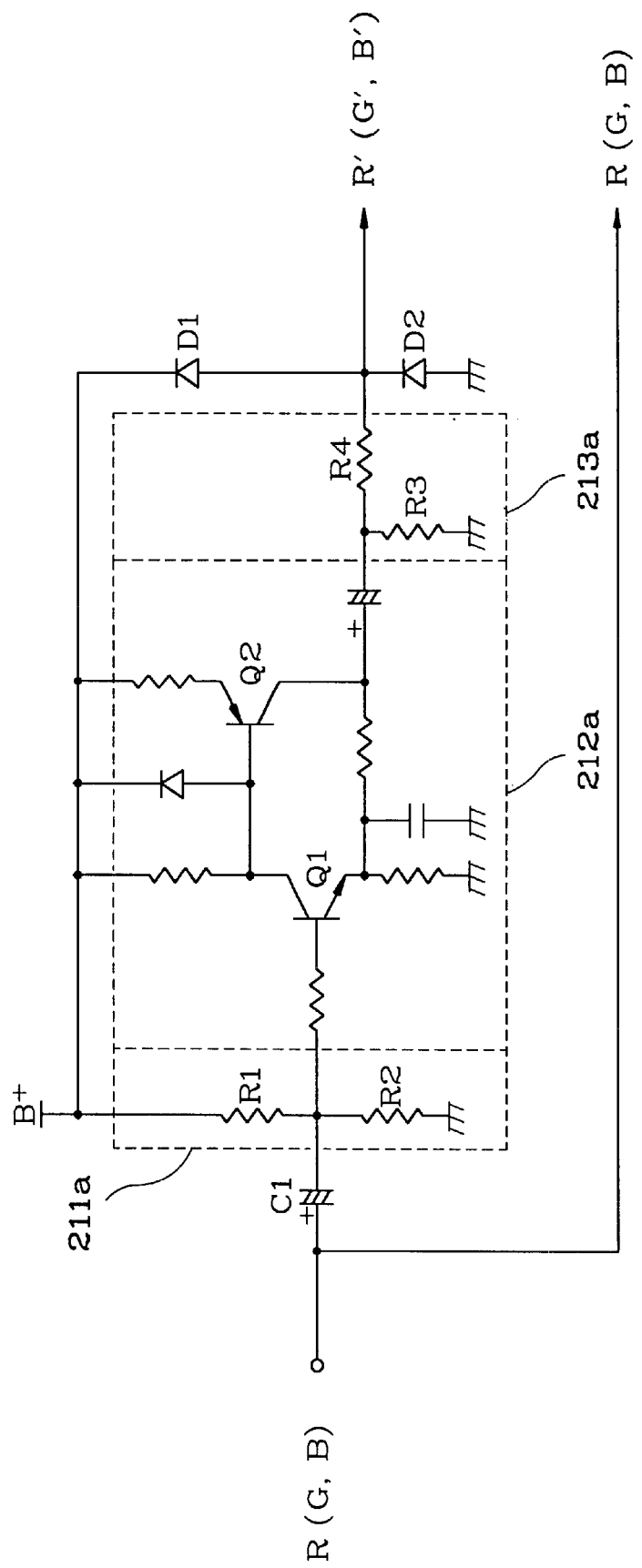
FIG. 3 is a detailed circuit diagram showing a preferred embodiment of any one of the three color signal portions of the pass-through circuit shown in FIG. 2.

In FIG. 3, a preferred embodiment of the pass-through circuit 210 is shown, using just one color (e.g., red) of the RGB image signal input.

In the embodiment, the red signal of the video signal input is split off and coupled, via a capacitor C1, to red biasing means 211a. Meanwhile, the red signal input from the host computer 100 is applied directly to the video pre-amplifier 221 of the video circuit 220, for amplification and primary display as the red component of an image. The red biasing means 211a comprises resistors R1 and R2 for dividing a supply voltage (B+) to control the degree of biasing and thereby supply the secondary red signal with a DC voltage value. Accordingly, the thus-biased secondary red signal is stabilized before being applied to the red current amplifier 212a, The red current amplifier 212a includes first and second transistors Q1 and Q2 connected in a complementary Darlington configuration. The amplified secondary red signal is applied to red impedance matching means 213a comprised of resistors R3 and R4 for matching the output impedance of the pass-through circuit 210 to the input impedance of the video input stage of a subsequently connected display device. Here, diodes D1 and D2 are employed for the suppression of electrostatic distortion (noise spiking) which may occur when connecting plural display devices. Though not specifically shown, the buffers U1 and U2 are preferably tri-state buffers formed using an integrated circuit chip number MC74ACT125 with both the control ports tied low.

As described above, the pass-through circuit 210 splits a first picture signal received from a signal source into a second picture signal so that plural picture signals are displayed as a simultaneously generated image through multiple display devices, thereby realizing a multi-display function. Consequently, according to the present invention, identical picture signals generated from a single signal source or host computer can be applied to multiple display devices without the use of separate or auxiliary hardware such as a signal splitter (adaptor), For example, as shown in FIG. 4, the primary signal source (host computer) 100 provides as an output a primary video signal to a first monitor (display device) 200 which in turn provides as an output a secondary video signal. That is, as the video signal "passes through" any such display device according to the present invention, a computer monitor can become the signal source for any number of subsequent display devices, by simply daisy-chaining a plurality of such displays, i.e., first through third monitors 200, 300 and 400 providing respective video outputs simultaneously. In doing so, the pass-through circuit 210 of each series-connected display device preserves a high signal-to-noise ratio in the video signal, so that a multi-display computer system can be extended at will.

It will be apparent to those skilled in the art that various modifications can be made in a display device having a pass-through function for a picture signal according to the present invention, without departing from the spirit of the invention. Thus, it is intended that the present invention cover such modifications as well as variations thereof, within the scope of the appended claims and their equivalents.

What is claimed is:

1. A display device for receiving a primary video signal consisting of an RGB image signal and synchronization signals generated by a host computer, said display device comprising:

a video signal processing and display means; and a pass-through means for receiving the primary video signal, for outputting the primary video signal to the video signal processing and display means, and for outputting a secondary video signal corresponding to the primary video signal, said pass-through means comprising anti-degradation means for preserving a high signal-to-noise ratio in said secondary video signal.

2. The display device of claim 1, wherein said video signal processing and display means comprises a video circuit for amplifying and displaying the primary RGB image signal output from said pass-through means.

3. The display device as defined in claim 1, further comprising:

a microcomputer for processing the synchronization signals output from said pass-through means.

4. The display device of claim 1, wherein said pass-through means comprises:

a means for biasing of the RGB image signal generated by the host computer, to provide a biased signal;

a means for amplifying the biased signal to provide a current signal at a predetermined current level, said current signal being delivered at a predetermined output impedance level; and a means for matching the output impedance of said current signal to an input impedance of a subsequent input stage of a subsequent display device.

5. The display device of claim 4, further comprising means for buffering the synchronization signals received by the display device.

6. The display device as defined in claim 4, wherein said buffers are comprised of two tri-state buffers whose control ports are tied low, both of said buffers being constituted by an integrated circuit chip number MC74ACT125.

7. A computer system for daisy-chaining a primary video signal from a host computer through a daisy chain of 1-through-n display devices, said computer system comprising:

a host computer for generating at an output thereof a primary video signal consisting of an RGB image signal and synchronization signals;

a plurality of display devices each having a primary video input, a secondary video output, and, interposed between the primary video input and the secondary video output, a pass-through means for outputting the primary video signal and a secondary video output for outputting a secondary video signal corresponding to the primary video signal, said plurality of display devices connected in a daisy chain such that the primary video input of display device 1 of the daisy chain is connected to said output of said host computer and each of display devices 2 through n of the daisy chain is connected at the primary video output thereof to the secondary video output of respective display devices 1 through n−1 of the daisy chain, said pass-through means comprising means for preserving a high signal-to-noise ratio in said secondary video signal.

8. A method for providing a video picture signal from a first display device, said signal capable of secondary application to a second display device for simultaneous display of a video picture represented by the signal, said method comprising the steps of:

(1) providing a primary video signal to a first display device, said video signal consisting of an RGB image signal and synchronization signals generated by a host computer; and (2) outputting the primary video signal to circuitry within the first display device for processing and display and for providing a further video signal corresponding to the primary video signal; and (3) processing the further video signal corresponding to the primary video signal in a manner such that its signal-to-noise ratio is preserved, whereby a secondary video signal is provided as an output signal, said signal being capable of secondary application to said second display device.

9. The method of claim 8, adapted for daisy-chaining the primary video signal through a daisy chain of n display devices, said method comprising following the second step with a further step in which the secondary video signal provided as an output signal is fed as a primary video signal input for a next display device, and then repeatedly cycling back through the second step and the further step n−1 times with successive devices of the n display devices, whereby the primary video signal is delivered to a daisy chain of n display devices.

* * * * *